Figure 6:
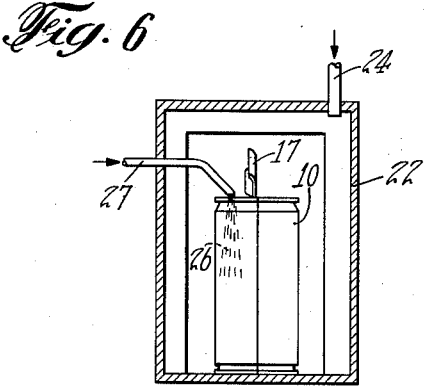

Aug. 7, 1956 W. B. ELAM 2,757,848
LIQUID-PROOF CONTAINER AND METHOD OF PRODUCING THE SAME
Filed Oct. 30, 1953 2 Sheets-Sheet 1
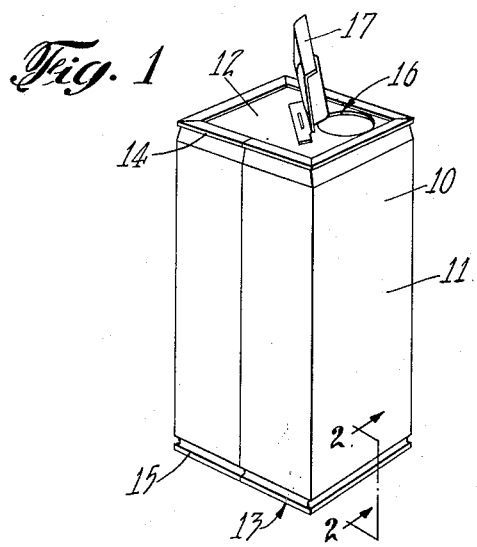
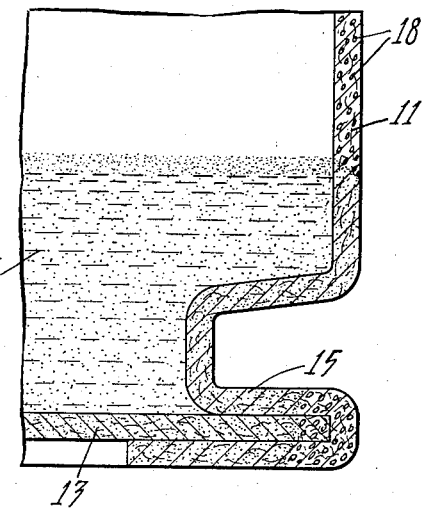
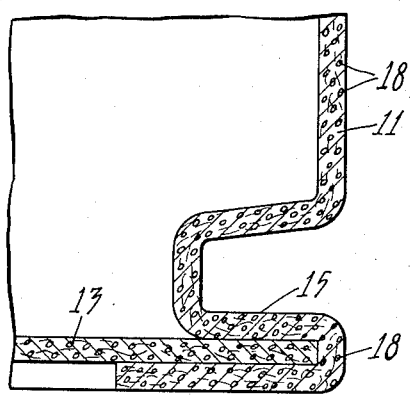
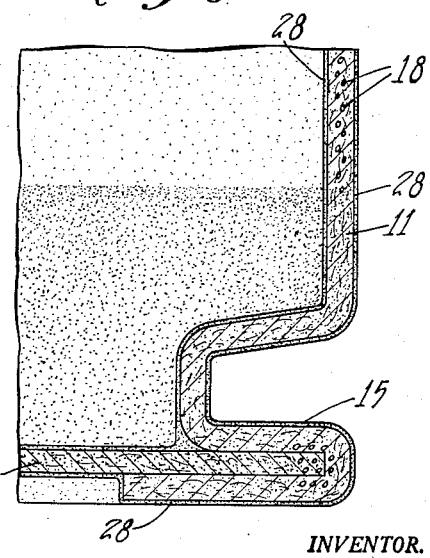
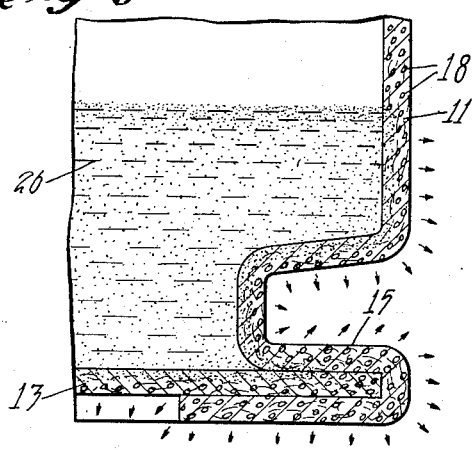
INVENTOR.
WILLIAM B. ELAM Aug. 7, 1956 W. B. ELAM 2,757,848
LIQUID-PROOF CONTAINER AND METHOD OF PRODUCING THE SAME
Filed Oct. 30, 1953. 2 Sheets-Sheet 2

INVENTOR.
WILLIAM B. ELAM
BY Charles H. Erne
Leland R. McCann
George W. Reiber
ATTORNEYS

United States Patent Office 2,757,848
Patented Aug. 7, 1956

2,757,848

LIQUID-PROOF CONTAINER AND METHOD OF PRODUCING THE SAME

William B. Elam, Jersey City, N. J., assignor to American Can Company, New York, N. Y., a corporation of New Jersey Application October 30, 1953, Serial No. 389,324

8 Claims. (Cl. 229—5.6)

The present invention relates to fibre containers suitable for the packaging of milk or similar liquid products and has particular reference to the production of a container, which, in addition to being provided with an overall continuous liquid-proof surface coating, is further protected against leakage by having the fibre stock of its vulnerable bottom region completely impregnated with a liquid proofing material prior to the application of the overall surface coating.

This is a companion application to copending application Serial Number 389,323, filed in the United States Patent Office on October 30, 1953, in the names of Ronald E. J. Nordquist and William B. Hommel, for Coating Machine.

Most of the commercial fibre milk containers in use at the present time are subjected to a suitable coating operation, such as immersion in a bath of molten paraffin or the like in order to obtain a continuous liquid-proof surface coating which provides the main barrier to the leakage of the liquid contents through the container walls. The coating material thus applied normally penetrates the fibre stock of the body only shallowly, leaving the inner fibres uncoated.

After being filled, the containers are often inadvertently subjected to rough treatment such as being dropped or bounced on their bottom ends through careless handling. This mishandling sometimes causes fracture of the somewhat brittle surface coating at the bottom region of the container, thereby giving the milk access to the uncoated inner fibres of the body stock. The resultant softening of the stock sometimes results in the development of small leaks in the bottom region of the container.

The present invention contemplates overcoming this undesirable condition by providing a fibre container in which only this vulnerable bottom region of the body is fortified against leakage by being fully impregnated with the coating material. In this manner, substantially all of the inner fibres in this region are liquid-proofed and there can be no softening of the body stock through the wetting action of the milk even though the surface coating is fractured. Furthermore, the impregnated bottom region of the container is mechanically strengthened or reenforced by the paraffin which displaces the residual air which is normally present within the interstices between the fibres of the body stock.

An object of the invention, therefore, is the provision of a method of producing a surface coated fibre container suitable for the packaging of milk or similar products wherein supplemental coating material is applied in such a manner as to completely impregnate the bottom region of the container only and thereby make possible a highly leak-resistant container requiring only a comparatively small amount of coating material.

Another object of the invention is the provision of a method of liquid proofing fibre containers wherein selected areas of the containers are subjected to a preflushing application of a coating material as a preliminary to the main coating operation in order to obtain substantially complete impregnation of these areas which offer a serious leakage problem.

Yet another object is the provision of a method of liquid-proofing fibre containers which includes the step of preflushing selected areas of the containers with coating material in such a manner as to prevent the entrapment of the residual air within the interstices between the fibres at these areas and thereby facilitate complete impregnation of the fibre stock.

A still further object of the invention is to provide a surface coated fibre container in which the fibrous stock of the whole bottom region is completely impregnated with a suitable coating material in order to protect it against leakage in the event the surface coating is ruptured through rough handling incident to distribution.

Numerous other objects and advantages of the invention will be apparent as it is better understood from the following description, which, taken in connection with the accompanying drawings, discloses a preferred embodiment thereof.

Figure 7:
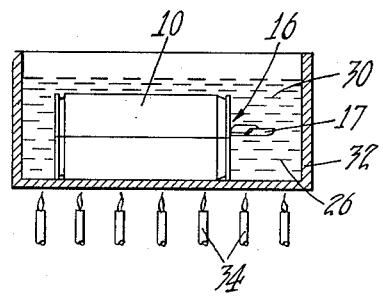
Figure 8:
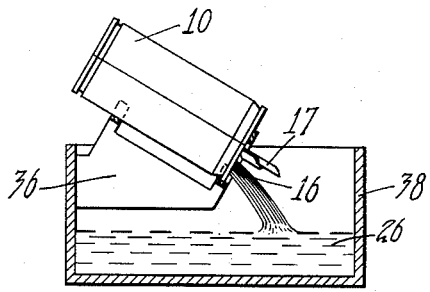
Figure 9:
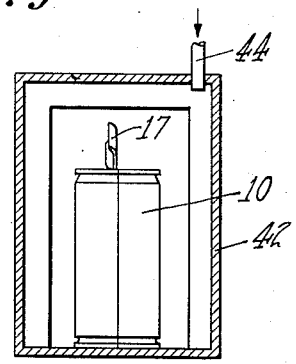

Referring to the drawings:

Figure 1 is a perspective view of a finished container embodying the present invention and produced according to the method steps of the invention;

Figs. 2 to 5, inclusive, are enlarged fragmentary sectional views taken substantially along the plane indicated by the lines 2—2 in Fig. 1 and illustrating the condition of the bottom portion of the container during successive stages in the herein described method of applying a liquid-proofing coating material; Fig. 2 showing its condition prior to the initiation of the method steps; Figs. 3 and 4, showing its condition during and at the completion of the preflushing step, respectively, and Fig. 5 showing its condition after the completion of the final coating operation; and Figs. 6 to 9, inclusive, are schematic views illustrating successive steps of the coating method and suitable means for carrying out these steps; Fig. 6 showing the preflushing step; Fig. 7 showing the main overall coating step; Fig. 8 showing the draining step; and Fig. 9 showing the final chilling step.

As a preferred or exemplary embodiment of the instant invention, the drawings illustrate a fibre milk container 10 of the type described in United States Patent 2,085,979, issued July 6, 1937, to John M. Hothersall on "Container." The container 10 comprises a body 11 which is substantially square in cross-section and is provided with top and bottom end members 12, 13 respectively, which are secured to the body 11 in folded end joints 14, 15. The bottom end joint 15 may be of the type described in J. P. Carroll Patent 2,524,766, issued October 10, 1950, entitled "Container." The container 10 is also provided with a filling and dispensing opening 16 located in one corner of the top end member 12, and a hinged plug 17 which is adapted to seal the opening 16.

As indicated in Fig. 2, the uncoated fibrous stock from which the container 10 is made normally contains a certain amount of residual or occluded air which is present in the interstices between the fibres. In the present drawings this residual air is graphically represented for the sake of clarity by air bubbles 18 dispersed rather uniformly throughout the walls of the container.

In practicing the method steps of the instant invention, the container 10, with its hinged plug 17 in open position at substantially right angles to the top end member 14, is placed in a chamber 22 (Fig. 6) which preferably is maintained in a heated condition by any suitable means. In the present embodiment of the invention, the chamber 22 is heated by hot air introduced through a pipe 24.

While the container is in the chamber 22, a measured amount of a suitable coating material 26 is poured through the container filling opening 16 into the interior of the container 10 in any suitable manner, as by means of a tube or pipe 27 leading from a suitable source of supply.

While, for the sake of brevity, the present specification will refer to paraffin as the coating material employed, it should be understood that the invention is not limited to the use of any particular coating material. Also, the term "coating material" is meant to broadly cover a material which functions as a surface coating material and/or as an impregnating material.

The paraffin 26 is preferably injected into the container 10 while in a molten state and is maintained in that condition by the heat of the chamber 22. The amount of molten paraffin 26 thus introduced, into the container 10 is preferably sufficient in volume to fill the container to a depth of approximately one half inch and will be hereinafter referred to as preflushing paraffin.

The container 10 is maintained within the heated chamber 22 for a length of time sufficient to enable the preflushing paraffin to soak into the bottom region of the container and, with the possible exception of the outer extremities of the bottom seam 15, completely impregnate the fibrous stock of this most vulnerable area of the container (see Fig. 4). The total impregnation of the stock is made possible by the fact that the preflushing paraffin is applied to only one side of the stock, thus permitting the paraffin to drive the residual air 18 ahead of it and out through the opposite side of the somewhat porous stock. A better understanding of this may be had by referring to Fig. 3, wherein the arrows illustrate the movement of the residual air 18 as the paraffin expels it through the exterior surfaces of the container walls.

It should be understood that complete penetration can also be obtained by applying the paraffin to the exterior side only of the bottom stock of the container, instead of to its interior side as illustrated in the drawings. In this event, the residual air 18 would be expelled through the interior surfaces of the container. The preflushing paraffin, however should not be applied to both sides of the stock, for in that case the residual air 18 would be driven from both directions to the interior of the stock and entrapped there, where it would act as a non-displaceable barrier to prevent or impede complete penetration and thus cause undesirable dry spots or layers within the stock.

During the time the container 10 is held within the heated chamber 22 for the above described preflushing operation on its bottom region, the uncoated stock of the non-preflushed, upper region of the container undergoes a heat treatment which expands its residual air and thus forces some of it out of the stock. This partially deaerated stock is thereby conditioned for the main coating treatment which will next be described.

After the preflushing operation, the container is subjected to a continuous overall application of paraffin in order to render all parts of it completely liquid-proof by providing a continuous interior and exterior surface coating 28 (Fig. 5). This may be accomplished in any suitable manner, one of the most satisfactory ways being to immerse the container in a bath 30 of molten paraffin contained in a tank or reservoir 32 which is kept heated by any suitable means such as gas burners 34 (see Fig. 7). In addition to coating the outside surfaces of the container, the molten paraffin flows through the container opening 16 and thus reaches the inside container surfaces.

It is not necessary to remove the excess preflushing paraffin from the interior of the container 10 prior to its immersion in the bath 30, for it will blend with the paraffin of the bath inside the container and thus assist in this overall coating step. The container is kept immersed in the paraffin bath for a sufficient length of time to enable the paraffin to partially impregnate the fibrous stock of its non-preflushed region in order to provide a secure anchorage for the surface coating 28. Since some of the residual air 18 in the non-preflushed fibrous stock of the container has been expelled as a result of the preheating treatment, the paraffin is absorbed faster than it would be absorbed had the stock not been so conditioned, thus reducing the time required for this overall coating step. Nevertheless, in spite of this preheating, some of the remaining residual air 18 is entrapped in this fibrous stock (see Fig. 5) because the paraffin in the bath 30 is applied simultaneously to both sides of the stock. Although the entrapped air limits the penetration of the paraffin and therefore is responsible for the presence of an unimpregnated dry layer within the stock, this condition is not objectionable since it occurs in a portion of the container which is not subject to leakage, and in fact is desirable from an economic standpoint since it results in a lower total consumption of paraffin.

When a sufficient amount of paraffin has been absorbed by the container stock, the container 10 is removed from the paraffin bath 30 and drained. This may conveniently be done by placing it in inverted position, with its opening 16 lowermost, on an inclined rack or bracket 36 secured to a wall of a draining tank 38 (see Fig. 8). With the container thus positioned, the excess paraffin in the inside of the container, which also includes the unabsorbed preflushing paraffin, drains out through the opening 16 and falls into the tank 38. Since the molten paraffin is somewhat viscous, a certain amount remains to form the continuous surface layer 28 which covers all portions of the container. The thickness of this surface layer 28 is, of course, determined by the duration of the draining period, and decreases as the period lengthens and the paraffin continues to drain off. By regulating the draining period, the thickness of the surface coating 28 may be accurately controlled.

The drained, surface coated container is next placed within a chilling chamber 42 (see Fig. 9) to set or harden the coating material so that the container may be handled. The chamber 42 may be cooled in any suitable manner, as by refrigerated air which is supplied through an inlet pipe 44. This chilling step is the final one in the coating process of the instant invention.

The final product of the instant invention, as seen in Figs. 1 and 5, is a container 10 provided with a continuous liquid-proof surface coating 28 covering the entire interior and exterior surfaces and a preflushed bottom region the fibrous material of which is completely impregnated with coating material to reenforce it against leakage in the event the surface coating 28 is broken. This impregnated bottom region includes the bottom end member 13, the adjacent body side wall 11 for a predetermined height and the bottom end joint 15. Other than this region the remaining portion of the container, which does not offer leakage problems, is only shallowly impregnated behind its surface coating. In this manner, a highly leak-resistant container is provided with a minimum consumption of coating material.

It will be understood that the invention is not limited to the specific disclosure herein illustrated and described. As one possible variation, the preflushing coating material may differ in composition from the coating material which is used in the immersion tank 32. In this event, the excess preflushing material would preferably be drained out before the container is immersed in the coating tank 32 in order to prevent it from mixing with and diluting or contaminating the overall coating material in the tank.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:
1. A liquid-proof container for the packaging of milk or the like, comprising a tubular body formed of fibrous stock and having a secured bottom end also formed of fibrous stock, said bottom end and the adjacent lower peripheral wall portion of said body constituting a container bottom region vulnerable to damage through rough handling, the fibrous stock of said bottom region being substantially free of residual air and completely impregnated therethrough with a liquid-proofing coating material to eliminate dry softenable layers therein, and a continuous overall liquid proofing surface coating on all wall parts of said container including said completely impregnated bottom region, whereby to provide a liquid-proof container having the fibrous stock in said vulnerable bottom region protected against the softening action of liquid container contents in the event said surface coating is fractured.

2. A liquid-proof container suitable for the packaging of milk or the like, comprising a tubular body formed of fibrous stock and having a bottom end also formed of fibrous stock secured to said body in an end joint, said end joint and said bottom end and also the adjacent lower peripheral wall portion of said body constituting a container bottom region vulnerable to damage through rough handling, the fibrous stock of said container bottom region being substantially free of residual air and completely impregnated therethrough with a liquid-proofing coating material to eliminate dry softenable fibrous layers therein, and a continuous overall liquid-proofing surface coating on all interior and exterior wall portions of said container including said completely impregnated bottom region, whereby to provide a liquid-proof container having the fibrous stock in said vulnerable bottom region protected against the impregnation and softening action of liquid container contents in the event its surface coating is fractured.

3. A liquid-proof container suitable for the packaging of milk or the like, comprising a tubular body formed of fibrous stock and having a secured bottom end also formed of fibrous stock, a continuous liquid-proof surface coating on said bottom end and on said body, said bottom end and the adjacent lower peripheral side wall portion of said body comprising constituting a container bottom region wherein said surface coating is vulnerable to fracture through rough handling, the remainder of said body constituting a container upper region wherein said surface coating is less vulnerable to fracture, the fibrous stock of said container bottom region being substantially free of occluded air and completely impregnated therethrough with a preflushing liquid-proofing coating material to eliminate dry softenable layers of fibre beneath said surface coating and thereby increase its resistance to leakage of the container contents in the event of fracture of said surface coating, said less vulnerable container upper region being only partially impregnated with a liquid-proofing coating material to minimize the total consumption of coating material in the preparation of said container.

4. A method of liquid proofing a fibre container having a closed bottom end to prepare it for the packaging of milk or the like, which comprises preflushing one side only of the bottom wall region of said container with a liquid coating material and holding the container in upright position for a predetermined period of time until substantially complete impregnation of the fibrous stock of said bottom wall region by the material is obtained, and then applying a surface coating of a coating material to all portions of said container, including said bottom wall region, whereby to produce a liquid-proof container having the fibrous stock in said bottom wall region protected against the softening action of the liquid container contents in the event its surface coating is fractured through rough handling.

5. A method of liquid proofing a fibre container having a closed bottom end to prepare it for the packaging of milk or the like, which comprises injecting a predetermined amount of a preflushing coating material into the opposite open end of said container, maintaining said container in upright position for a predetermined time interval with the injected coating material in the closed bottom end thereof until substantially complete impregnation of the fibrous stock of the bottom wall region of said container by the material is obtained, and then applying a surface coating of a coating material to all portions of said container including the aforesaid bottom wall region, whereby to produce a liquid-proof container having the fibrous stock in said bottom region protected against the softening action of the liquid container contents in the event its surface coating is fractured through rough handling.

6. A method of liquid proofing a fibre container having a closed bottom end to prepare it for the packaging of milk or the like, which comprises injecting a predetermined amount of a preflushing coating material into the opposite open end of said container, maintaining said container in upright position for a predetermined period of time with said injected preflushing coating material in the closed bottom end thereof until substantially complete impregnation of the fibrous stock of the bottom wall region of said container by said material is obtained, immersing said container in a bath of coating material to apply said coating material to all surfaces of said container including the aforesaid wall surfaces of said bottom region, and draining the excess coating material from said container until a continuous surface coating of desired thickness is obtained, whereby to produce a liquid-proof container having the fibrous stock in said bottom region protected against the softening action of the liquid container contents in the event its surface coating is fractured through rough handling.

7. A method of liquid proofing a fibre container having a closed bottom end to prepare it for the packaging of milk and the like, which comprises injecting a predetermined amount of a preflushing coating material into the opposite open end of said container, maintaining said container in upright position for a predetermined time interval with said preflushing coating material in the closed bottom end thereof until substantially complete impregnation of the fibrous stock of the bottom wall region of said container by said material is obtained, immersing said container in a bath of coating material to partially impregnate the fibrous stock of the non-preflushed wall region of said container and to apply a continuous surface coating to all surfaces of said container, draining the excess coating material from said container until the desired thickness of said continuous surface coating is obtained, and then chilling said container to set said coating material to condition said container for handling, whereby to produce a liquid-proof container having the fibrous stock in said bottom region protected against the softening action of the liquid container contents in the event its surface coating is fractured through rough handling.

8. A method of liquid proofing a fibre container to prepare it for the packaging of milk or the like, which comprises injecting a predetermined amount of a preflushing coating material into said container, maintaining said preflushing coating material in the bottom end of said container until substantially complete impregnation of the fibrous stock of the bottom region of said container is obtained, subjecting said container to a heat treatment to partially deaerate the fibrous stock of the remainder of said container, immersing said container in a bath of coating material to partially impregnate said partially deaerated fibrous stock of the non-preflushed region of said container and to apply a continuous surface coating to all surfaces of said container, draining the excess coating material from said container until the desired thickness of said continuous surface coating is obtained, and then chilling said container to set said coating material to condition said container for handling, whereby to produce a liquid-proof container having the fibrous stock in said bottom region protected against the softening action of the contents of the container in the event its surface coating is fractured through rough handling.

References Cited in the file of this patent

UNITED STATES PATENTS

| | | |
|---|---|---|
| 925,913 | Jenkins | June 22, 1909 |
| 2,335,865 | Lanigan et al. | Dec. 7, 1943 |
| 2,403,855 | Gilbert | July 9, 1946 |
| 2,555,315 | Carroll | June 5, 1951 |